(12) United States Patent
Aoki (10) Patent No.: US 10,017,110 B2
(45) Date of Patent: Jul. 10, 2018

(54) VEHICLE-MOUNTED DISPLAY DEVICE

(71) Applicant: Yazaki Corporation, Minato-ku, Tokyo (JP)

(72) Inventor: Kunimitsu Aoki, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/142,241

(22) Filed: Apr. 29, 2016

(65) Prior Publication Data

US 2016/0243984 A1   Aug. 25, 2016

Related U.S. Application Data

(63) Continuation of application No. PCT/JP2014/073944, filed on Sep. 10, 2014.

(30) Foreign Application Priority Data

Nov. 1, 2013   (JP) ................................. 2013-227829

(51) Int. Cl.
*B60Q 1/00* (2006.01)
*G09G 5/00* (2006.01)
(Continued)

(52) U.S. Cl.
CPC ................ *B60Q 9/00* (2013.01); *B60K 35/00* (2013.01); *B60R 1/00* (2013.01); *G02B 27/01* (2013.01);
(Continued)

(58) Field of Classification Search
CPC . B60Q 1/00; G09G 5/00; G02B 27/01; G02B 27/14
(Continued)

(56) References Cited

U.S. PATENT DOCUMENTS 4,999,011 A   3/1991   Suzuki et al.
4,999,012 A   3/1991   Suzuki et al.
(Continued)

FOREIGN PATENT DOCUMENTS

JP   S63-164037 U   10/1988
JP   H08-115491 A   5/1996
(Continued)

OTHER PUBLICATIONS

Oct. 21, 2014—(WO) Written Opinion—App PCT/JP2014/073944.
(Continued)

*Primary Examiner* — Daniel Hess
(74) *Attorney, Agent, or Firm* — Banner & Witcoff, Ltd.

(57) ABSTRACT

A vehicle-mounted display device is provided with a first attention calling indicator, and a second attention calling indicator. The first attention calling indicator includes first light emitting units which emit light, and is located in one of front left and right sides of a driver's seat, and guides light from the first light emitting units toward a direction of the driver's seat using a reflection from a windshield. The second attention calling indicator includes second light emitting units which emit light, and is located in the other of the front left and right sides of the driver's seat, and guides the light from the second light emitting units toward the direction of the driver's seat using the reflection from the windshield or a reflection from a door window so as to perform display symmetrically along with the first attention calling indicator.

5 Claims, 6 Drawing Sheets (51) Int. Cl.
  *B60Q 9/00* (2006.01)
  *B60K 35/00* (2006.01)
  *G02B 27/01* (2006.01)
  *G08G 1/16* (2006.01)
  *B60R 1/00* (2006.01)

(52) U.S. Cl.
  CPC ......... *G02B 27/0101* (2013.01); *G08G 1/166* (2013.01); *B60Q 9/008* (2013.01); *B60R 2300/8093* (2013.01); *G02B 2027/0123* (2013.01); *G02B 2027/0161* (2013.01)

(58) Field of Classification Search
  USPC .............. 362/543; 340/425.5; 345/7, 8, 633; 359/630
  See application file for complete search history.

(56) References Cited

U.S. PATENT DOCUMENTS

| | | |
|---|---|---|
| 5,519,536 A | 5/1996 | Hoehn |
| 2005/0259033 A1* | 11/2005 | Levine .................. B60K 26/00 345/7 |
| 2010/0253494 A1 | 10/2010 | Inoue |
| 2010/0321170 A1* | 12/2010 | Cooper .................. G02B 27/01 340/425.5 |

FOREIGN PATENT DOCUMENTS

| | | |
|---|---|---|
| JP | H09-263216 A | 10/1997 |
| JP | 2003-291689 A | 10/2003 |
| JP | 2010-143411 A | 7/2010 |
| WO | 2009-072366 A1 | 6/2009 |

OTHER PUBLICATIONS

Oct. 21, 2014—International Search Report—Intl App PCT/JP2014/073944.

Jun. 6, 2017—(JP) Notification of Reasons for Refusal—App 2013-227829, Eng Tran.

* cited by examiner

VEHICLE-MOUNTED DISPLAY DEVICE

CROSS REFERENCE TO RELATED APPLICATIONS

This application is a continuation of PCT application No. PCT/JP2014/073944, which was filed on Sep. 10, 2014 based on Japanese Patent Application (No. 2013-227829) filed on Nov. 1, 2013, the contents of which are incorporated herein by reference.

BACKGROUND OF THE INVENTION

Field of the Invention

The present invention relates to a vehicle-mounted display device.

Description of Related Art

Proposed in the related art is a vehicle-mounted display device that detects an object in the vicinity of a vehicle, determines whether or not a driver needs to be warned that the object is detected, and, in a case where it is determined that the driver needs to be so warned, performs attention calling by providing a warning to the driver. In the vehicle-mounted display device, a head-up display device (hereinafter referred to as a "HUD") that performs display on a windshield surface performs the attention calling.

Furthermore, it is proposed that the vehicle-mounted display device as described above includes multiple light emitters that are provided on a dashboard, and that a light emitter which corresponds to a position of an object that is a warning target is selectively caused to emit light and thus the attention calling is provided to the driver using a reflection from the windshield. With the vehicle-mounted display device, because visual recognition of light from the light emitter by the driver is made possible using the reflection from the windshield, the driver recognizes the object as if a light beam had come from a direction of the object that is the warning target (refer to Patent Literature 1).

[Patent Literature 1] JP-A-8-115491

However, the vehicle-mounted display device that is described in Patent Literature 1 is inferior in right and left symmetry in terms of using the reflection from the windshield, and thus there is room for improving an attention calling property. That is, in a case of a right-hand drive vehicle, a larger display region is provided for an obstacle or the like to the left of the driver, and on the other hand, a small display region is provided for an obstacle or the like to the right of the driver. For this reason, for example, although display implementation is performed in the same manner both in a case where a different vehicle approaches from the left and in a case where the different vehicle approaches from the right, due to a difference in size between display regions, it is difficult for the driver to recognize that the display indicates that the two different vehicles that are the same appear to approach, and to recognize that the one different vehicle actually approaches on either of the left and right sides.

SUMMARY

One or more embodiments provide a vehicle-mounted display device which is capable of achieving an improvement in an attention calling property.

In an aspect (1), one or more embodiments provide a vehicle-mounted display device provided with a first attention calling indicator, and a second attention calling indicator. The first attention calling indicator includes first light emitting units which emit light. The first attention calling indicator is located in one of front left and right sides of a driver's seat. The first attention calling indicator guides light from the first light emitting units toward a direction of the driver's seat using a reflection from a windshield. The second attention calling indicator includes second light emitting units which emit light The second attention calling indicator is located in the other of the front left and right sides of the driver's seat The second attention calling indicator guides the light from the second light emitting units toward the direction of the driver's seat using the reflection from the windshield or a reflection from a door window so that it is possible to perform display which displays symmetrically along with the first attention calling indicator at a time of visual recognition by a driver.

According to the aspect (1), a vehicle-mounted display device includes a first attention calling indicator which guides light from a light emitting unit toward a direction of a driver's seat using a reflection from a windshield, and a second attention calling indicator which guides light from a light emitting unit toward the direction of the driver's seat using the reflection from the windshield or a reflection from a door window, and thus is able to perform display which displays symmetrically along with the first attention calling indicator. For this reason, although a difference in size between the left and right sides of the windshield with respect to the driver's seat is present, the second attention calling indicator is able to perform display using the reflection from the door window, and solves a problem of asymmetry due to the difference in size between the left and right sides of the windshield. Consequently, in a case where the display implementation that is the same on the left and right sides is performed, for example, it is easy for the driver to recognize that two different vehicles, which are the same, appear to approach, and so forth, and thus an improvement in attention calling can be achieved.

In an aspect (2), the first light emitting units and the second light emitting units respectively include multiple light emitters, and the second attention calling indicator includes an adjustment member which adjusts a virtual distance from the light emitter to a reflection surface, at least in the light emitter which uses the reflection of the door window.

According to the aspect (2), the vehicle-mounted display device, when necessary, includes an adjustment member which adjusts a virtual distance from the light emitter to a reflection surface at least in the light emitting unit which uses the reflection from the door window, so that recognition by the driver can be made possible by adjusting the virtual distance from the light emitter to the reflection surface, as is the case when the reflection of the light from the windshield is used.

According to one or more embodiments, a vehicle-mounted display device can be provided that is capable of achieving an improvement in an attention calling property.

DETAILED DESCRIPTION

Figure 1:
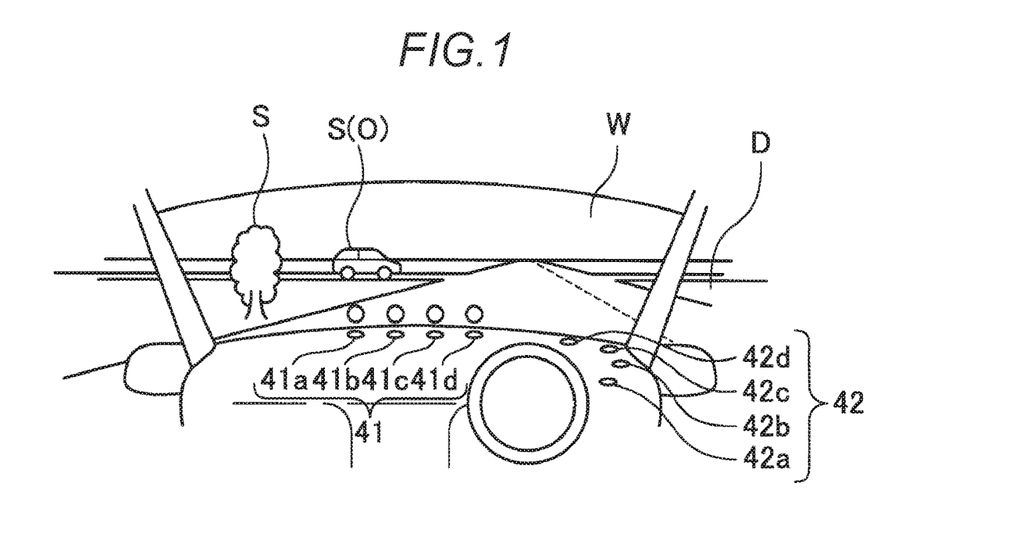
FIG. 1 is a front-view diagram illustrating a vehicle that includes a vehicle-mounted display device according to an embodiment of the present invention.
Figure 2:
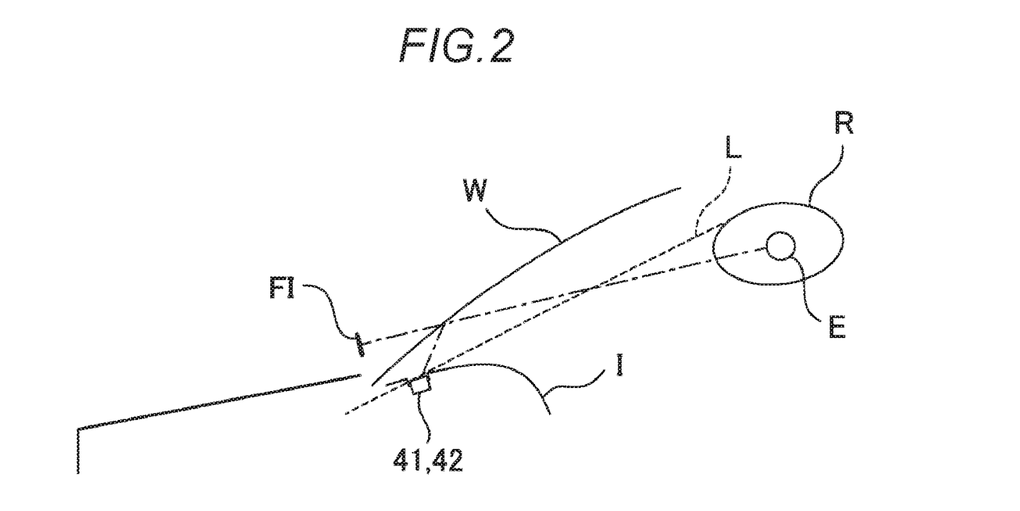
FIG. 2 is a schematic side-view diagram illustrating the vehicle-mounted display device that is illustrated in FIG. 1.

A suitable embodiment of the present invention will be described below referring to the drawings, but the present invention is not limited to the embodiment that will be described below. FIG. 1 is a diagram illustrating a front-view vehicle that includes a vehicle-mounted display device according to the embodiment of the present invention. FIG. 2 is a schematic side-view diagram illustrating the vehicle-mounted display device that is illustrated in FIG. 1. Furthermore, FIG. 3 is a block diagram illustrating the vehicle-mounted display device according to the embodiment of the present invention.

Figure 3:
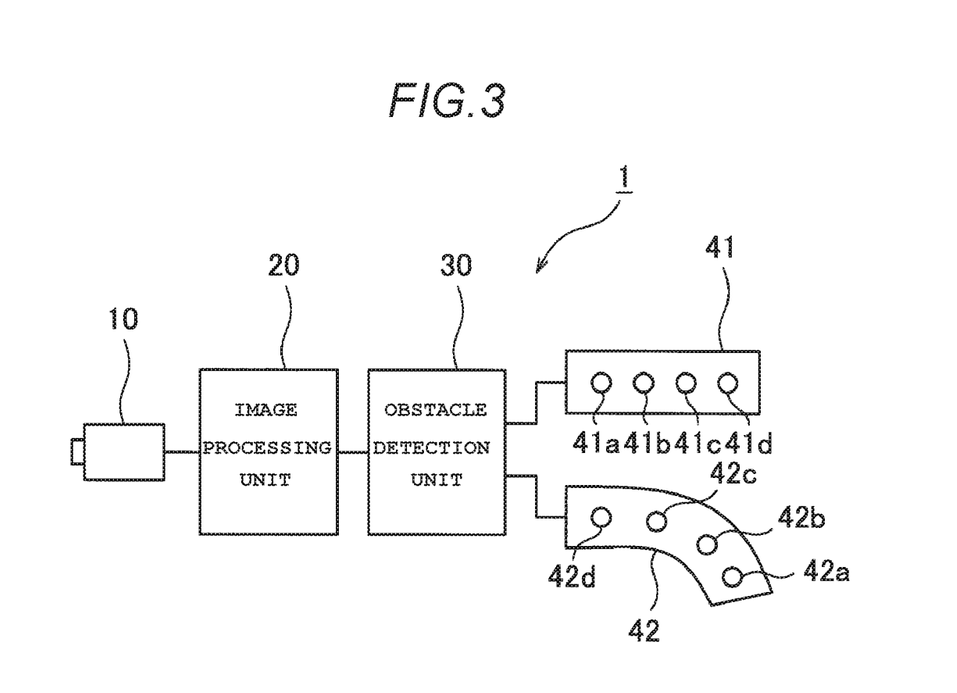
FIG. 3 is a block diagram illustrating the vehicle-mounted display device according to the embodiment of the present invention.

As illustrated in FIGS. 1 to 3, a vehicle-mounted display device 1 includes a camera 10, an image processing unit 20, an obstacle detection unit 30, and first and second attention calling indicators 41 and 42. The camera 10 captures an image of what appears in front of a vehicle, and transmits data on an image that is captured to the image processing unit 20.

The image processing unit 20 detects a three-dimensional object S from the data on the image that is captured by the camera 10. For example, the image processing unit 20 compares images that are captured at different times, and thus detects the three-dimensional object S. Furthermore, if possible, the image processing unit 20 stores multiple template images of a vehicle, a bicycle, a pedestrian, and the like, and performs matching, and thus these three-dimensional objects may be detected. The three-dimensional objects may be detected using a different technique.

The obstacle detection unit 30 detects an obstacle O that may be in the way of a host vehicle, from the three-dimensional object S that is detected by the image processing unit 20. When it comes to detecting the obstacle O, the obstacle detection unit 30 determines whether or not the three-dimensional object S is a moving object, whether or not the three-dimensional object S is toward the host vehicle, and so forth. Furthermore, although the three-dimensional object S is not toward the host vehicle, in a case where a dog, a cat, an infant, or the like that suddenly changes the moving direction, is detected as the three-dimensional object S, or in a case where a vehicle that stops for a time before a stop line and then is in a state of waiting for restarting, these situations may also be determined as the obstacle O. Furthermore, the obstacle O may be detected using a different technique or a reference.

The first and second attention calling indicators 41 and 42 are configured from multiple (for example, four) light emitters (light emitting units) 41a to 41d and 42a to 42d, respectively. The first attention calling indicator 41 is provided to one of left and right sides of a driver's seat (to the left side in the case of a right-hand drive vehicle), and guides light from the light emitters 41a to 41d toward a direction of the driver's seat, using a reflection from a windshield W.

The second attention calling indicator 42 is provided to the other of the left and right sides of the driver's seat (to the right side in the case of the right-hand drive vehicle), and guides light from the light emitters 42a to 42d in the direction of the driver's seat, using the reflection from the windshield W and a reflection from a door window D. Thus, the second attention calling indicator 42 is able to perform display which displays symmetrically along with the first attention calling indicator 41 at a time of visual recognition by a driver.

Furthermore, as illustrated in FIG. 2, in a case where what appears in front of the vehicle is visually recognized from an upper limit of an eye range R indicating a range where a view point position E for the driver moves, the first and second attention calling indicators 41 and 42 are at positions that cannot be viewed directly. Specifically, as illustrated in FIG. 2, the first and second attention calling indicators 41 and 42 are provided at positions below straight line L on the rear side of an instrument panel I.

In more detail, the light emitters 41a to 41d of the first attention calling indicator 41 emits light toward the windshield W. For this reason, from the point of view of the driver, attention calling display by the light emitters 41a to 41d is formed as a virtual image FI.

Figure 4:
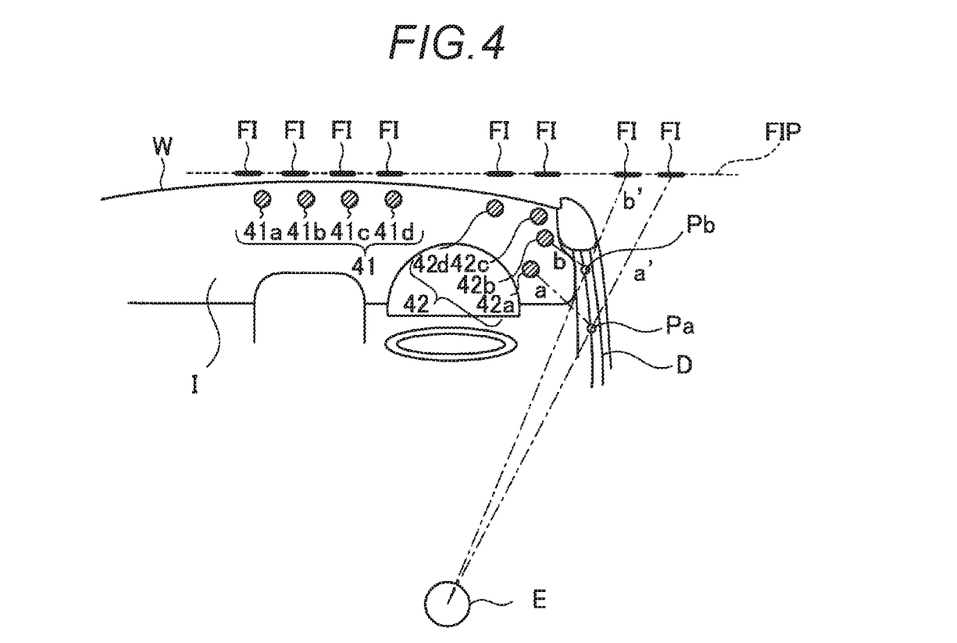
FIG. 4 is a top-view diagram illustrating a virtual image state of first and second attention calling indicators.

FIG. 4 is a top-view diagram illustrating a virtual image state of the first and second attention calling indicators 41 and 42. As described above, the light emitters 41a to 41d of the first attention calling indicator 41 emit light toward the windshield W and thus forms the virtual image FI. In contrast, in the second attention calling indicator 42, third and fourth elements 42c and 42d emit light toward the windshield W, and forms the virtual image FI, and on the other hand, first and second light emitters 42a and 42b emit light toward the door window D and thus forms the virtual image FI.

In this manner, a problem of asymmetry due to a difference in size between left and right sides of the windshield with respect to the driver's seat is solved by using the reflection from the door window D.

Moreover, the first light emitter 42a is installed at a position at which a specular reflection state is attained at a reflection point Pa, and the second light emitter 42b is installed at a position at which the specular reflection state is attained at a reflection point Pb. That is, in a case where light from the first light emitter 42a is specularly reflected at the reflection point Pa, the first light emitter 42a is installed in such a manner that the light reaches the view point position E for the driver. In a case where light from the second light emitter 42b is specularly reflected at the reflection point Pb, the second light emitter 42b is installed in such a manner that the light reaches the view point position E for the driver.

Furthermore, in terms of vehicle construction, in most cases, there is a difference between a distance a from the first light emitter 42a to the door window D and a distance a' from the door window D to the virtual image FI (a virtual image surface FIP). In the same manner, in most cases, there is a difference between a distance b from the second light emitter 42b to the door window D and a distance b' from the door window D to the virtual image FI (the virtual image surface FIP). In some cases, the distance a (or b) is increased depending on curvature of the door window, and can be set to the distance a' (or the distance b'). If the distance a' (or the distance b') is not available, the second attention calling indicator 42, when necessary, includes a lens, a Fresnel lens, a magnifying mirror (an adjustment member), and the like that adjusts a light beam display distance, at least in the light emitters 42a and 42b that use the reflection from the door window. Accordingly, this is because the virtual image surface FIP is made consistent by adjusting a virtual distance from the light emitter to a reflection surface and thus can be visually recognized by the driver as is the case when the reflection of the light from the windshield W is used. That is, with the lens, the Fresnel lens, the magnifying lens, the like, the distance a from the first light emitter 42a to the door window D is set to virtually be the distance a' and the distance b from the second light emitter 42b to the door window D is set to be virtually the distance b'. Thus, virtual image surface FIP is made consistent.

Figure 5:
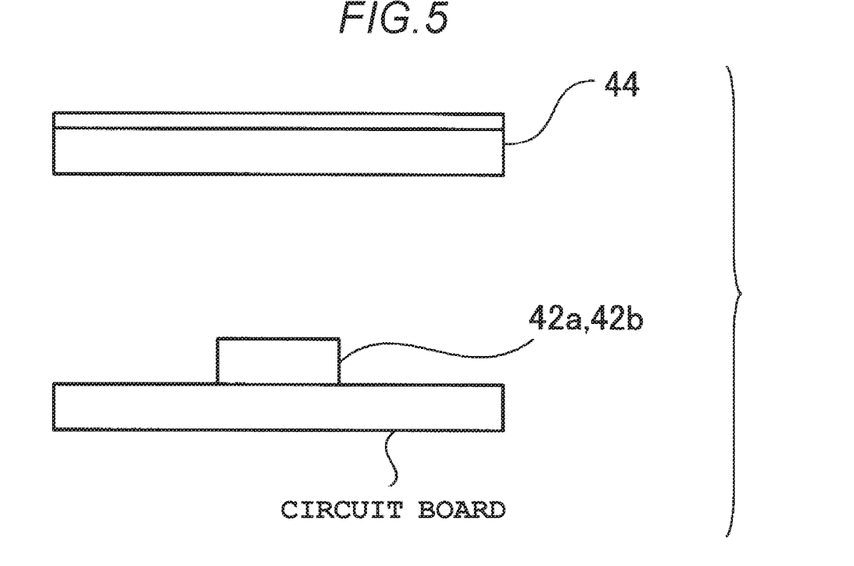
FIG. 5 is a side-view diagram illustrating peripheral configurations of first and second light emitters.

FIG. 5 is a side-view diagram illustrating peripheral configurations of the first and second light emitters 42a and 42b. As illustrated in FIG. 5, a lens 44 is provided to the sides in a direction of emitting light, of the first and second light emitters 42a and 42b. Accordingly, the virtual distance from the light emitter to a reflection surface is adjusted.

Moreover, the light emitters 41a to 41d and 42a to 42d of the attention calling indicators 41 and 42, respectively, that are illustrated in FIGS. 1 and 4, are provided directly to the instrument panel I, but may be accommodated in a case without being limited to this.

Figure 6:
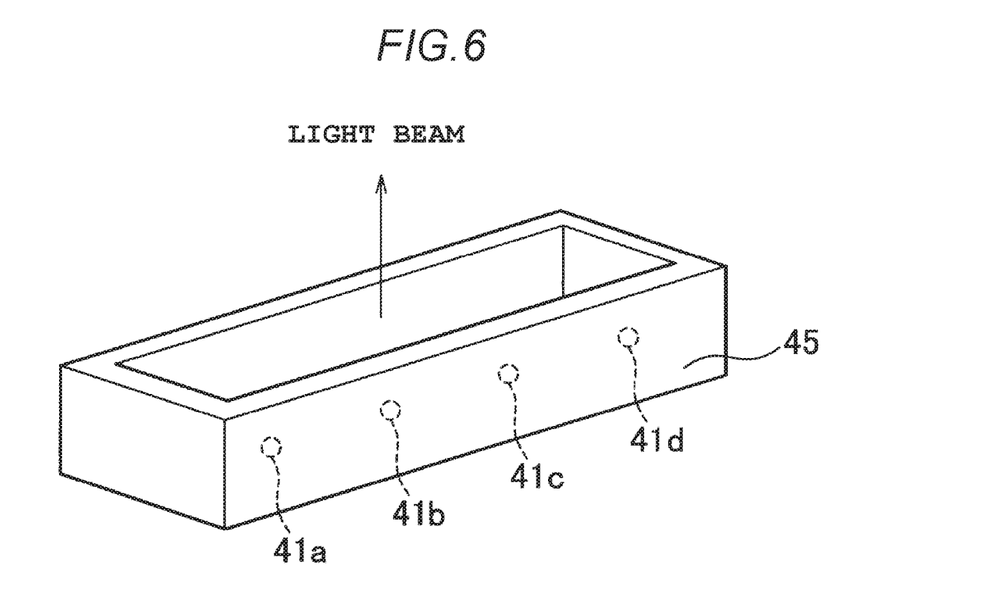
FIG. 6 is a perspective diagram illustrating a case in which the light emitters of the first attention calling indicator are accommodated.

FIG. 6 is a perspective diagram illustrating a case 45 in which the light emitters 41a to 41d of the first attention calling indicator 41 are accommodated. As illustrated in FIG. 6, the case 45 is a general box type that has an opening in the upper surface thereof, and the light emitters 41a to 41d are accommodated in this box. A through hole for a lead wire or the like through which electric current is supplied to the light emitters 41a to 41d is formed in the lower surface side of the case 45. Moreover, it goes without saying that a case of the second attention calling indicator 42 according to the present embodiment is a case that is curved to some extent in terms of arrangement of the light emitters 42a to 42d. Furthermore, a member, such as a louver, that controls a light beam direction may be provided to the opening side that is the upper surface of the case 45.

Figure 7:
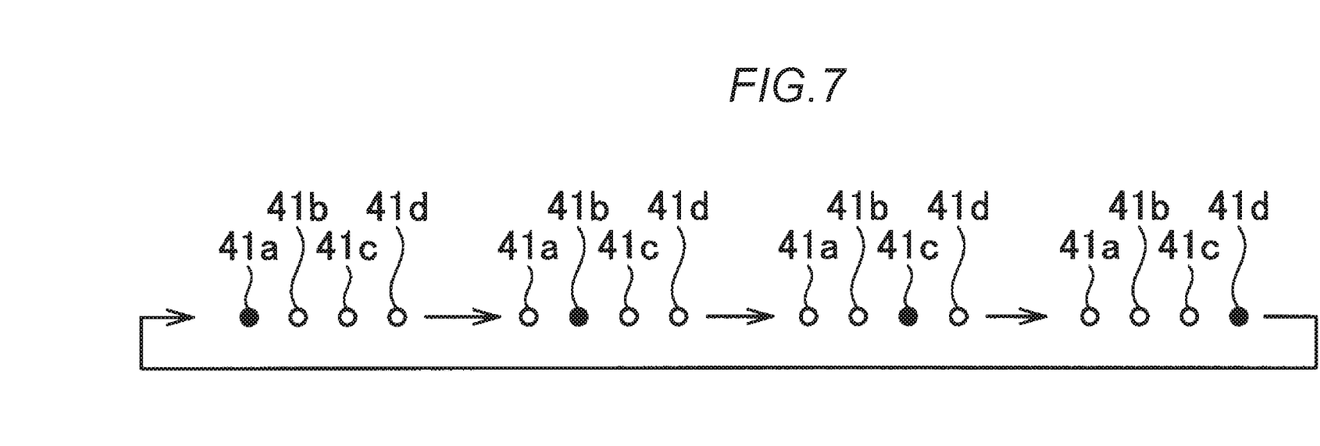
FIG. 7 is a diagram illustrating that the first attention calling indicator implements attention calling.

Next, one example of operation of the vehicle-mounted display device 1 according to the present embodiment is described. FIG. 7 is a diagram illustrating that the first attention calling indicator 41 implements attention calling. First, as illustrated in FIG. 1, a different vehicle that approaches from the left of the host vehicle is assumed to be detected, as the obstacle O, by the obstacle detection unit 30. In this case, as illustrated in FIG. 7, first, the first attention calling indicator 41 causes the first light emitter 41a to emit light and subsequently causes the second, third, and fourth light emitters 41b to 41d to emit light in this order. Thereafter, the first attention calling indicator 41 starts over and causes the first light emitter 41a to emit light. Accordingly, the virtual images FI in accordance with the order in which the light-emitting takes place are sequentially formed, and it can be reported in a sensory manner to the driver that the obstacle O approaches from the left d.

Figure 8:
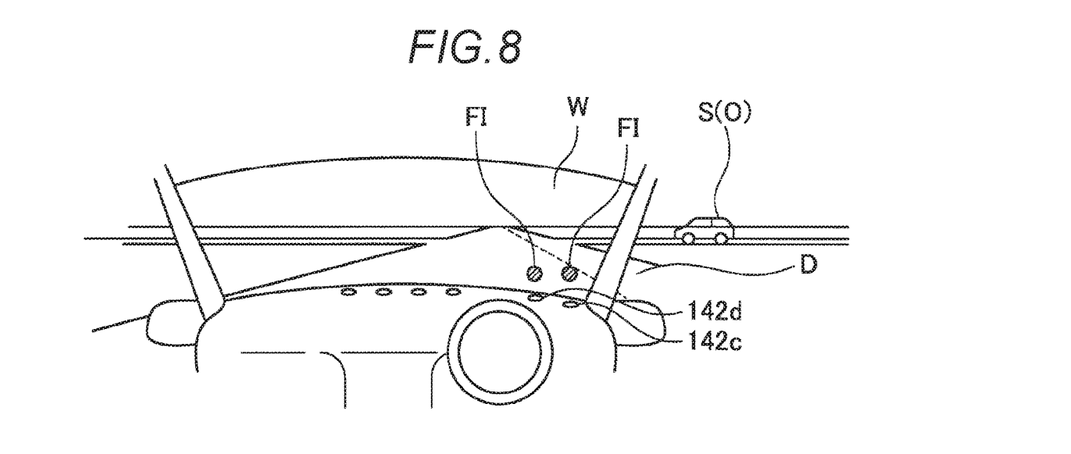
FIG. 8 is a diagram illustrating one example of operation of a vehicle-mounted display device in the related art.

FIG. 8 is a diagram illustrating one example of operation of a vehicle-mounted display device in the related art. At this point, in the vehicle-mounted display device in the related art, the virtual image FI is not formed using the reflection from the door window D. For this reason, for example, only third and fourth light emitters 142c and 142d are provided to the second attention calling indicator 142. For this reason, although the display implementation is performed in the same manner as in FIG. 7, the third and fourth light emitters 142c and 142d only emit light alternately, and it cannot be reported in a sensory manner that the obstacle O approaches from the right.

Figure 9:
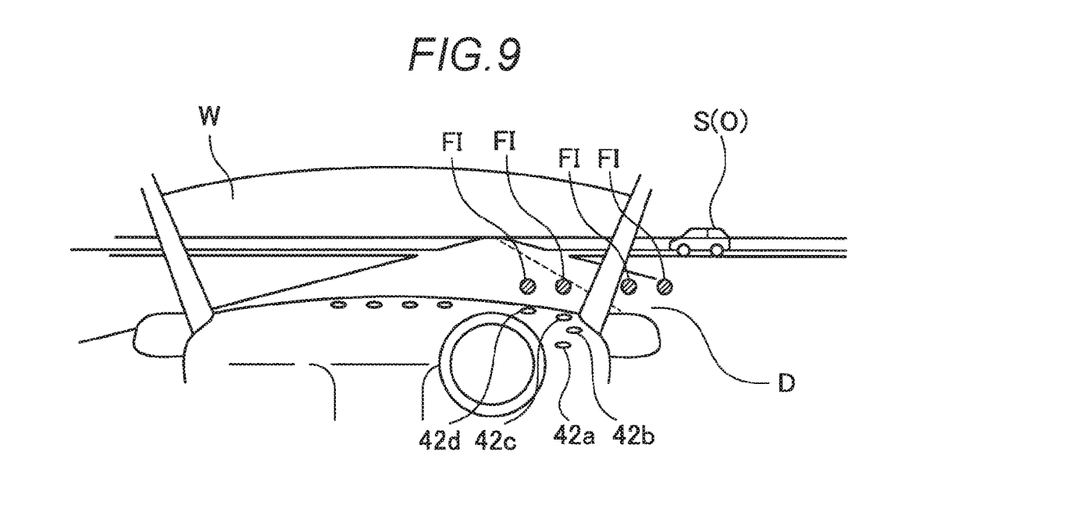
FIG. 9 is a diagram illustrating that the second attention calling indicator implements the attention calling.

FIG. 9 is a diagram illustrating that the second attention calling indicator 42 implements the attention calling. The second attention calling indicator 42 according to the present embodiment forms the virtual image FI using the reflection from the door window W. For this reason, it is possible to perform the display implementation symmetrically with respect to the display implementation that is illustrated in FIG. 7. That is, first, the second attention calling indicator 42 causes the first light emitter 42a to emit light and subsequently causes the second, third, and fourth light emitters 42b to 42d to emit light in this order. Accordingly, the virtual images FI in accordance with the order in which the light-emitting takes place are sequentially formed, and it can be reported in a sensory manner to the driver that the obstacle O approaches from the right. Therefore, an improvement in an attention calling property can be achieved.

In this manner, the vehicle-mounted display device 1 according to the present embodiment includes the first attention calling indicator 41 that guides the light from the multiple light emitters 41a to 41d toward the direction of the driver's seat, using the reflection from the windshield W, and the second attention calling indicator 42 that guides the light from the multiple light emitters 42a to 42d toward the direction of the driver's seat, using the reflection from the windshield W and the reflection from a door window D, and that is able to perform the display which displays symmetrically along with the first attention calling indicator 41. For this reason, although the difference in size between the left and right sides of the windshield with respect to the driver's seat is present, the second attention calling indicator 42 is able to perform the display using the reflection from the door window D, and solves the problem of the asymmetry due to the difference in size between the left and right sides of the windshield. Consequently, in a case where the display implementation that is the same on the left and right sides is performed, for example, it is easy for the driver to recognize that two different vehicles, which are the same, appear to approach, and so forth, and thus an improvement in attention calling can be achieved.

Furthermore, because at least each of the first and second light emitters 42a and 42b, which use the reflection from the door window D, when necessary, includes the lens, the Fresnel lens, the magnifying mirror, and the like that adjust the light beam display distance, the recognition by the driver can be made possible by adjusting the virtual distance from the light emitter to the reflection surface, as is the case when the reflection of the light from the windshield W is used.

The present invention is described in detail or referring to the specific embodiment, but it is apparent to a person of ordinary skill in the art that various changes or modifications can be made without departing from the spirit and scope of the present invention. For example, the vehicle-mounted display device 1 according to the present embodiment forms the virtual image FI, using the light emitters 41a to 41d and 42a to 42d, but without being limited to this, anything else that emits light to the windshield W and the door window D may be usable.

Figure 10:
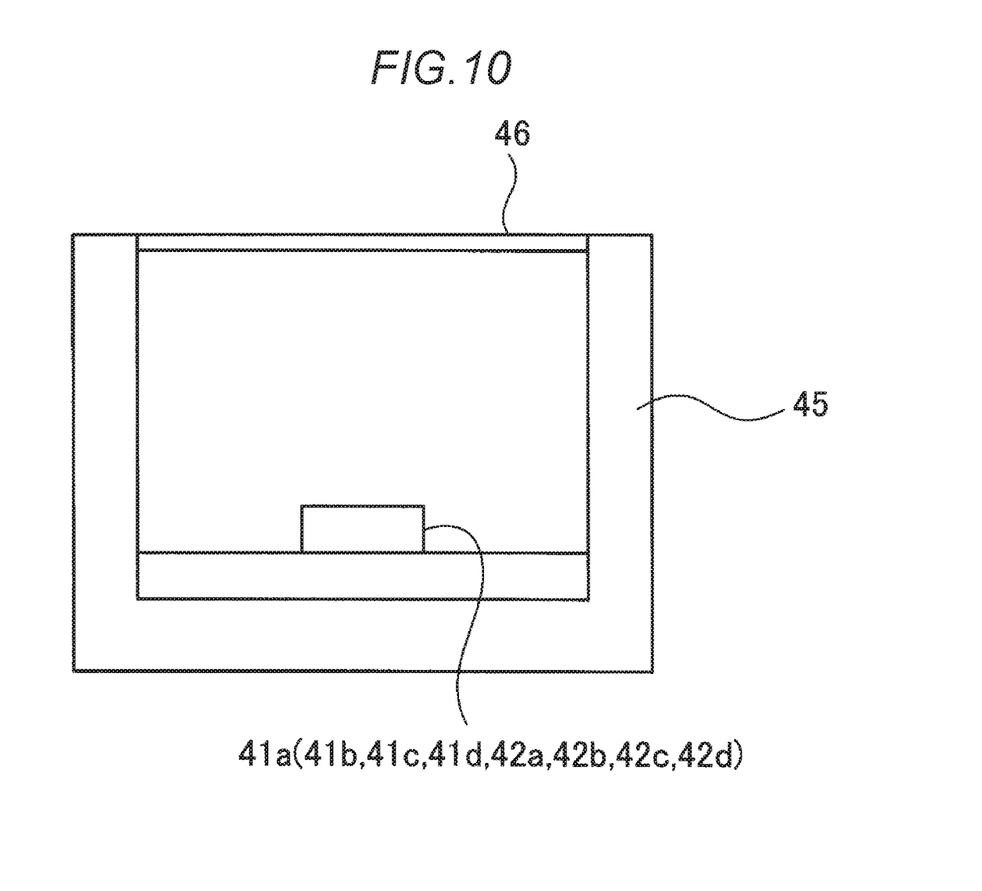
FIG. 10 is a schematic side-view diagram illustrating an internal configuration of the case.

Furthermore, the following configuration may be employed according to the present embodiment. FIG. 10 is a schematic side-view diagram illustrating an internal configuration of the case 45. As illustrated in FIG. 10, a diffusion board 46 may be provided on the opening side of the upper surface of the case 45. Furthermore, in a case where the diffusion board 46 is provided, the number of the light emitters 41a to 41d and 42a to 42d is set to be increased and so forth, and thus the virtual image FI can be displayed to be caused to flow on a line, by the diffusion board 46. That is, for example, in a case where the obstacle O approaches the host vehicle from the right side, the virtual image FI can also be formed that moves smoothly from the right side to the center using the reflection from the door window D and the reflection from the windshield W.

Furthermore, the example in which the vehicle-mounted display device 1 according to the present embodiment is applied to the right-hand drive vehicle is described, but without being limited to this, the vehicle-mounted display device can be applied to a left-hand drive vehicle.

At this point, characteristics of the vehicle-mounted display device according to the embodiment are briefly summarized and listed as the following [1] and [2].

[1] A vehicle-mounted display device (1) comprising:
  a first attention calling indicator (41); and
  a second attention calling indicator (42),
    wherein the first attention calling indicator (41) includes first light emitting units (41a to 41d) which emit light,
    wherein the first attention calling indicator (41) is located in one of front left and right sides of a driver's seat,
    wherein the first attention calling indicator (41) guides light from the first light emitting units (41a to 41d) toward a direction of the driver's seat using a reflection from a windshield,
    wherein the second attention calling indicator (42) includes second light emitting units (42a to 42d) which emit light,
    wherein the second attention calling indicator (42) is located in the other of the front left and right sides of the driver's seat, and
    wherein the second attention calling indicator (42) guides the light from the second light emitting units (42a to 42d) toward the direction of the driver's seat using the reflection from the windshield or a reflection from a door window so that it is possible to perform display which displays symmetrically along with the first attention calling indicator (41) at a time of visual recognition by a driver.

[2] The vehicle-mounted display device (1) according to [1] described above,
    wherein the first light emitting units (41a to 41d) and the second light emitting units (42a to 42d) respectively include multiple light emitters, and
    wherein the second attention calling indicator (42) includes an adjustment member which adjusts a virtual distance from the light emitter to a reflection surface, at least in the light emitter which uses the reflection of the door window.

INDUSTRIAL APPLICABILITY

According to the present invention, an effect is accomplished in which the improvement in the attention calling property can be achieved. The present invention that accomplishes the effect is useful for a vehicle-mounted display device.

DESCRIPTION OF REFERENCE NUMERALS AND SIGNS

1 VEHICLE-MOUNTED DISPLAY DEVICE
10 CAMERA
20 IMAGE PROCESSING UNIT
30 OBSTACLE DETECTION UNIT
41 FIRST ATTENTION CALLING INDICATOR
41a TO 41d LIGHT EMITTER (FIRST LIGHT EMITTING UNIT)
42 SECOND ATTENTION CALLING INDICATOR
42a TO 42d LIGHT EMITTER (SECOND LIGHT EMITTING UNIT)
44 LENS
45 CASE
D DOOR WINDOW
E VIEW POINT POSITION
FI VIRTUAL IMAGE
FIP VIRTUAL IMAGE SURFACE
I INSTRUMENT PANEL
O OBSTACLE
Pa, Pb REFLECTION POINT
R EYE RANGE
S THREE-DIMENSIONAL OBJECT
W WINDSHIELD

What is claimed is:

1. A vehicle-mounted display device comprising:
  a first attention calling indicator; and
  a second attention calling indicator,
    wherein the first attention calling indicator includes first light emitting units which emit light,
    wherein the first attention calling indicator is located in one of front left and right sides of a driver's seat,
    wherein, in response to an object approaching from a side of the driver's seat on which the first attention calling indicator is located, the first attention calling indicator guides light from the first light emitting units toward a direction of the driver's seat using a reflection from a windshield to display reflections of the first attention calling indicator that form virtual images,
    wherein the second attention calling indicator includes second light emitting units which emit light,
    wherein the second attention calling indicator is located in the other of the front left and right sides of the driver's seat,
    wherein in response to an object approaching from a side of the driver's seat on which the second attention calling indicator is located, the second attention calling indicator guides the light from the second light emitting units toward the direction of the driver's seat using a reflection from the windshield and a reflection from a door window to display the reflections of the second attention calling indicator that form virtual images,
    wherein the virtual images of the second attention calling indicator are approximately linearly and approximately symmetrically displayed with respect to the driver's seat at a time of visual recognition by a driver along with the virtual images of the first attention calling indicator at a time of visual recognition by the driver,
    wherein the virtual images of the second attention calling indicator are displayed in a predefined sequence that provides an indication of the direction from which the object is approaching, and
    wherein the second light emitting units include a first light emitter that emits light toward the windshield and a second light emitter that emits light toward the door window.

2. The vehicle-mounted display device according to claim 1, wherein the predefined sequence starts with the second light emitting unit having a reflection, from the door window, that forms a virtual image farthest from the driver's seat and continuing to the second light emitting unit having a reflection, from the windshield, that forms a virtual image closest to the driver's seat.

3. A vehicle-mounted display device comprising:
a first attention calling indicator; and
a second attention calling indicator,
wherein the first attention calling indicator includes first light emitting units which emit light,
wherein the first attention calling indicator is located in one of front left and right sides of a driver's seat,
wherein, in response to an object approaching from a side of the driver's seat on which the first attention calling indicator is located, the first attention calling indicator guides light from the first light emitting units toward a direction of the driver's seat using a reflection from a windshield to display reflections of the first attention calling indicator that form virtual images,
wherein the second attention calling indicator includes second light emitting units which emit light,
wherein the second attention calling indicator is located in the other of the front left and right sides of the driver's seat,
wherein in response to an object approaching from a side of the driver's seat on which the second attention calling indicator is located, the second attention calling indicator guides the light from the second light emitting units toward the direction of the driver's seat using a reflection from the windshield and a reflection from a door window to display the reflections of the second attention calling indicator that form virtual images,
wherein the second light emitting units include a first light emitter that emits light toward the windshield and a second light emitter that emits light toward the door window, and
wherein the virtual images of the second attention calling indicator are displayed in a predefined sequence that provides an indication of the direction from which the object is approaching, the predefined sequence starting with the second light emitting unit having a reflection, from the door window, that forms a virtual image farthest from the driver's seat and continuing to the second light emitting unit having a reflection, from the windshield, that forms a virtual image closest to the driver's seat.

4. The vehicle-mounted display device according to claim 3, wherein the predefined sequence starting with the second light emitting unit having a reflection, from the door window, that forms a virtual image farthest from the driver's seat and continuing to the second light emitting unit having a reflection, from the windshield, that forms a virtual image closest to the driver's seat.

5. The vehicle-mounted display device according to claim 3, wherein the second attention calling indicator includes an adjustment member that adjusts a virtual distance from the second light emitter that emits light toward the door window to a reflection surface.

* * * * *